(12) United States Patent
Park et al.

(10) Patent No.: US 9,359,500 B2
(45) Date of Patent: Jun. 7, 2016

(54) RESIN COMPOSITIONS AND ARTICLES INCLUDING THE SAME

(71) Applicant: Cheil Industries Inc., Gumi-si (KR)

(72) Inventors: Jung-Eun Park, Uiwang-si (KR); Kee-Hae Kwon, Uiwang-si (KR); Jin-Young Huh, Uiwang-si (KR); Chang-Min Hong, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/141,579

(22) Filed: Dec. 27, 2013

(65) Prior Publication Data
US 2014/0187718 A1    Jul. 3, 2014

(30) Foreign Application Priority Data
Dec. 28, 2012    (KR) .................. 10-2012-0157580

(51) Int. Cl.
| C08L 69/00 | (2006.01) |
| C08L 25/00 | (2006.01) |
| C08L 33/04 | (2006.01) |
| C08L 33/10 | (2006.01) |
| C08L 55/02 | (2006.01) |

(52) U.S. Cl.
CPC ............ *C08L 69/00* (2013.01); *C08L 55/02* (2013.01)

(58) Field of Classification Search
None
See application file for complete search history.

(56) References Cited

U.S. PATENT DOCUMENTS

| 4,006,272 A | 2/1977 | Sakaguchi et al. |
| 4,027,073 A | 5/1977 | Clark |
| 4,034,013 A | 7/1977 | Lane |
| 4,045,514 A | 8/1977 | Iwahashi et al. |
| 4,139,600 A | 2/1979 | Rollmann et al. |
| 4,180,494 A | 12/1979 | Fromuth et al. |
| 4,287,315 A | 9/1981 | Meyer et al. |
| 4,303,772 A | 12/1981 | Novicky |
| 4,393,153 A | 7/1983 | Hepp |
| 4,400,333 A | 8/1983 | Neefe |
| 4,694,031 A | 9/1987 | Morita et al. |
| 4,745,029 A | 5/1988 | Kambour |
| 4,788,251 A | 11/1988 | Brown et al. |
| 4,803,235 A | 2/1989 | Okada |
| 4,906,202 A | 3/1990 | Germ |
| 4,906,696 A | 3/1990 | Fischer et al. |
| 5,025,066 A | 6/1991 | DeRudder et al. |
| 5,061,558 A | 10/1991 | Fischer et al. |
| 5,068,285 A | 11/1991 | Laughner |
| 5,124,402 A | 6/1992 | Laughner et al. |
| 5,189,091 A | 2/1993 | Laughner |
| 5,200,492 A | 4/1993 | Ohnaga et al. |
| 5,219,915 A | 6/1993 | McKee et al. |
| 5,280,070 A | 1/1994 | Drzewinski et al. |
| 5,284,916 A | 2/1994 | Drzewinski |
| 5,292,809 A | 3/1994 | Drzewinski et al. |
| 5,308,894 A | 5/1994 | Laughner |
| 5,369,154 A | 11/1994 | Laughner |
| 5,441,997 A | 8/1995 | Walsh et al. |
| 5,449,557 A | 9/1995 | Liebler et al. |
| 5,470,658 A | 11/1995 | Gasca et al. |
| 5,731,389 A | 3/1998 | Bailly et al. |
| 6,060,538 A | 5/2000 | Gallucci |
| 6,252,002 B1 | 6/2001 | Yamada et al. |
| 6,486,251 B1 | 11/2002 | Patel |
| 6,545,089 B1 | 4/2003 | DeRudder et al. |
| 6,646,068 B2 | 11/2003 | O'Brien et al. |
| 6,653,391 B1 | 11/2003 | Weber et al. |
| 6,790,887 B1 | 9/2004 | Nishihara |
| 7,294,659 B2 | 11/2007 | Yatake |
| 7,385,013 B2 | 6/2008 | Kobayashi et al. |
| 7,695,815 B2 | 4/2010 | Agarwal et al. |
| 7,732,515 B2 | 6/2010 | Jang et al. |
| 7,888,409 B2 | 2/2011 | Hayata et al. |
| 7,960,464 B2 | 6/2011 | Kobayashi et al. |

(Continued)

FOREIGN PATENT DOCUMENTS

| CN | 1285858 A | 2/2001 |
| CN | 102007183 A | 4/2011 |

(Continued)

OTHER PUBLICATIONS

Inberg et al., "Co-continuous polycarbonate/ABS blends", Polymer 43 (2002) 2425-2434.
Search Report in counterpart Chinese Application No. 201310743679.9 dated Apr. 16, 2015, pp. 1-2.
Taiwanese Office Action in commonly owned Taiwanese Application No. 96136059 issued on May 5, 2011, pp. 1-9.
English Translation of Taiwanese Office Action in commonly owned Taiwanese Application No. 96136059 issued on May 5, 2011, pp. 1-5.
European Search Report in commonly owned European Application No. 07808474 dated Sep. 28, 2011, pp. 1-4.

(Continued)

*Primary Examiner* — Jeffrey Mullis
(74) *Attorney, Agent, or Firm* — Additon, Higgins & Pendleton, P.A.

(57) ABSTRACT

Disclosed is a resin composition including (A) a polycarbonate resin and (B) a rubber modified vinyl-based graft copolymer, and (C) about 1 to about 9 parts by weight of a random copolymer of a compound represented by the following Chemical Formula 1, an aromatic vinyl monomer, and a vinyl cyanide monomer, based on about 100 parts by weight of the polycarbonate resin (A) and the rubber-modified vinyl-based graft copolymer (B):

[Chemical Formula 1]

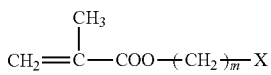

wherein, in the above chemical formula, m is an integer ranging from 0 to 10, and X is phenyl, methylphenyl, methylethylphenyl, methoxyphenyl, cyclohexylphenyl, chlorophenyl, bromophenyl, phenylphenyl group, or benzylphenyl.

6 Claims, No Drawings

(56) References Cited

U.S. PATENT DOCUMENTS

| | | | |
|---|---|---|---|
| 8,044,143 | B2 | 10/2011 | Park et al. |
| 2002/0042483 | A1 | 4/2002 | Vanderbilt |
| 2003/0032725 | A1 | 2/2003 | Gaggar et al. |
| 2005/0159533 | A1 | 7/2005 | Nabeshima et al. |
| 2005/0239949 | A1 | 10/2005 | Nakamura et al. |
| 2006/0004154 | A1 | 1/2006 | DeRudder et al. |
| 2006/0030647 | A1 | 2/2006 | Ebeling et al. |
| 2006/0051587 | A1 | 3/2006 | Mori et al. |
| 2006/0100307 | A1 | 5/2006 | Uerz et al. |
| 2006/0135690 | A1 | 6/2006 | Juikar et al. |
| 2007/0265371 | A1 | 11/2007 | Takahashi et al. |
| 2008/0009571 | A1 | 1/2008 | Pixton et al. |
| 2008/0153954 | A1 | 6/2008 | Arpin |
| 2008/0242789 | A1 | 10/2008 | Zhu et al. |
| 2009/0080079 | A1 | 3/2009 | Kogure et al. |
| 2009/0118402 | A1 | 5/2009 | Jang et al. |
| 2009/0189321 | A1 | 7/2009 | Jones et al. |
| 2009/0209696 | A1 | 8/2009 | Lee et al. |
| 2009/0275678 | A1 | 11/2009 | Kumazawa et al. |
| 2010/0029855 | A1 | 2/2010 | Matsuoka et al. |
| 2010/0113648 | A1 | 5/2010 | Niessner et al. |
| 2010/0152357 | A1 | 6/2010 | Kwon et al. |
| 2010/0160529 | A1 | 6/2010 | Lee et al. |
| 2010/0160532 | A1 | 6/2010 | Park et al. |
| 2010/0168272 | A1 | 7/2010 | Park et al. |
| 2010/0197827 | A1 | 8/2010 | Kim et al. |
| 2010/0240831 | A1 | 9/2010 | Kim et al. |
| 2010/0256288 | A1 | 10/2010 | Kim et al. |
| 2011/0009524 | A1 | 1/2011 | Kwon et al. |
| 2011/0021677 | A1 | 1/2011 | Kwon et al. |
| 2011/0040019 | A1 | 2/2011 | Kwon et al. |
| 2011/0160380 | A1 | 6/2011 | Kwon et al. |
| 2012/0065318 | A1* | 3/2012 | Park et al. ............ 524/508 |
| 2012/0129989 | A1 | 5/2012 | Kim et al. |
| 2013/0158161 | A1* | 6/2013 | Kim et al. ............ 523/122 |

FOREIGN PATENT DOCUMENTS

| | | |
|---|---|---|
| CN | 102459459 A | 5/2012 |
| DE | 19845317 A1 | 4/2000 |
| DE | 69829099 T2 | 12/2005 |
| EP | 0033393 A2 | 8/1981 |
| EP | 0114288 A2 | 8/1984 |
| EP | 0180417 A2 | 5/1986 |
| EP | 0246620 A2 | 5/1987 |
| EP | 0376616 A2 | 7/1990 |
| EP | 0528462 A1 | 2/1993 |
| EP | 0635547 A2 | 1/1995 |
| EP | 0787769 A2 | 8/1997 |
| EP | 1010725 A2 | 6/2000 |
| EP | 2204412 A1 | 7/2010 |
| JP | 53-134799 A | 11/1978 |
| JP | 57-125241 A | 8/1982 |
| JP | 58-196250 A | 11/1983 |
| JP | 62-268612 A | 11/1987 |
| JP | 04-023856 A | 1/1992 |
| JP | 04-359954 A | 12/1992 |
| JP | 05-098136 A | 4/1993 |
| JP | 05-125260 A | 5/1993 |
| JP | 05-194829 | 8/1993 |
| JP | 06-122771 A | 5/1994 |
| JP | 06-136212 A | 5/1994 |
| JP | 06-313089 A | 11/1994 |
| JP | 07-026101 | 1/1995 |
| JP | 07-145307 A | 6/1995 |
| JP | 10-060241 A | 3/1998 |
| JP | 10-060242 A | 3/1998 |
| JP | 10-219026 A | 8/1998 |
| JP | 11-129246 A | 5/1999 |
| JP | 11-181168 A | 7/1999 |
| JP | 11-279385 | 10/1999 |
| JP | 2000-265001 A | 9/2000 |
| JP | 2000-327992 | 11/2000 |
| JP | 2001-049072 A | 2/2001 |
| JP | 2002-080676 A | 3/2002 |
| JP | 2002-528589 A | 9/2002 |
| JP | 2003-525335 | 8/2003 |
| JP | 2003-313392 | 11/2003 |
| JP | 2005-220173 A | 8/2005 |
| JP | 2006-249292 A | 9/2006 |
| JP | 2006-257284 A | 9/2006 |
| JP | 2006-342246 A | 12/2006 |
| JP | 2007-077222 | 3/2007 |
| JP | 2008-013702 A | 1/2008 |
| JP | 2008-115249 A | 5/2008 |
| KR | 1996-0007611 B1 | 6/1996 |
| KR | 10-1998-0004915 | 6/1998 |
| KR | 10-1998-027070 | 7/1998 |
| KR | 1998-055579 | 9/1998 |
| KR | 10-1999-0018287 | 3/1999 |
| KR | 10-1999-0029495 A | 4/1999 |
| KR | 10-1999-0054644 | 7/1999 |
| KR | 10-2000-0038719 A | 7/2000 |
| KR | 10-2000-0048033 A | 7/2000 |
| KR | 10-2001-0032100 A | 4/2001 |
| KR | 10-2001-0070975 A | 7/2001 |
| KR | 2004-0079118 A | 9/2004 |
| KR | 10-2005-0032100 A | 4/2005 |
| KR | 10-0514272 B | 9/2005 |
| KR | 10-2005-0109049 A | 11/2005 |
| KR | 10-0581437 B | 5/2006 |
| KR | 10-0709878 B1 | 4/2007 |
| KR | 10-2007-0070686 A | 7/2007 |
| KR | 10-2007-0072372 A | 7/2007 |
| KR | 10-0767428 A1 | 10/2007 |
| KR | 10-0816474 B1 | 3/2008 |
| KR | 10-2008-0062975 A | 7/2008 |
| KR | 10-2008-0063054 A | 7/2008 |
| KR | 10-0871436 B1 | 11/2008 |
| KR | 10-2009-0030511 A | 3/2009 |
| KR | 10-0886348 B1 | 3/2009 |
| KR | 10-0937820 B1 | 1/2010 |
| KR | 10-2010-0066066 A | 6/2010 |
| KR | 10-2010-0071715 | 6/2010 |
| KR | 10-2010-0075390 A | 7/2010 |
| KR | 10-1035072 B1 | 5/2011 |
| WO | 00/24829 A1 | 5/2000 |
| WO | 02/088044 A1 | 11/2002 |
| WO | 2005/075554 A1 | 8/2005 |
| WO | 2007/119920 A1 | 10/2007 |
| WO | 2007/140101 A1 | 12/2007 |
| WO | 2008/039017 A1 | 4/2008 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A1 | 10/2009 |
| WO | 2011/013882 A1 | 2/2011 |

OTHER PUBLICATIONS

International Preliminary Report on Patentability in commonly owned International Application No. PCT/KR2007/004743, dated Mar. 31, 2009, pp. 1-5.

International Search Report in commonly owned International Application No. PCT/KR2007/004743, dated Jan. 4, 2008, pp. 1-2.

Office Action in commonly owned U.S. Appl. No. 12/413,630 mailed Jun. 23, 2009, pp. 1-9.

Final Office Action in commonly owned U.S. Appl. No. 12/413,630 mailed Dec. 7, 2009, pp. 1-9.

Advisory Action in commonly owned U.S. Appl. No. 12/413,630 mailed Apr. 9, 2010, pp. 1-3.

French Search Report and Written Opinion in commonly owned French Application No. 0959193 dated May 27, 2010, pp. 1-5.

Office Action in commonly owned U.S. Appl. No. 12/640,343 mailed Aug. 29, 2011, pp. 1-7.

Office Action in commonly owned U.S. Appl. No. 12/640,343 mailed Feb. 22, 2012, pp. 1-13.

Final Office Action in commonly owned U.S. Appl. No. 12/640,343 mailed Jun. 5, 2012, pp. 1-12.

Office Action in commonly owned U.S. Appl. No. 12/641,752 mailed Jan. 10, 2011, pp. 1-10.

(56) References Cited

OTHER PUBLICATIONS

Notice of Allowance in commonly owned U.S. Appl. No. 12/641,752 mailed Jul. 20, 2011, pp. 1-9.
International Search Report in commonly owned International Application No. PCT/KR2009/007917 dated Aug. 24, 2010, pp. 1-9.
English-translation of Abstract for Korean Publication No. 1998-055579, published Sep. 25, 1998, pp. 1.
IGRANOX 1076, SpecialChem, Ciba, now part of BASF, 2012 Retrieved online<http://www.specialchem4adhesives.com>, pp. 1.
Office Action in commonly owned U.S. Appl. No. 13/362,068 mailed Apr. 6, 2012, pp. 1-24.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 mailed Nov. 8, 2011, pp. 1-10.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 mailed Dec. 14, 2011, pp. 1-9.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
European Search Report in commonly owned European Application No. 10196806 dated Apr. 27, 2011, pp. 1-5.
European Search Report in commonly owned European Application No. 08873425.6 dated May 29, 2012, pp. 1-5.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Final Office Action in commonly owned U.S. Appl. No. 12/792,176 mailed Apr. 19, 2012, pp. 1-10.
Chinese Search Report in commonly owned Chinese Application No. 200980159831.0 dated Dec. 17, 2012, pp. 1-2.
International Search Report in commonly owned International Application No. PCT/KR2009/007944 dated Aug. 13, 2010, pp. 1-6.
Full English Translation of JP 04-359953.
Full English Translation of JP 04-359954.

\* cited by examiner

RESIN COMPOSITIONS AND ARTICLES INCLUDING THE SAME

CROSS-REFERENCE TO RELATED APPLICATION

This application claims priority to and the benefit of Korean Patent Application No. 10-2012-0157580 filed in the Korean Intellectual Property Office on Dec. 28, 2012, the entire disclosure of which is incorporated herein by reference.

FIELD OF THE INVENTION

A resin composition and articles including the same are disclosed.

BACKGROUND OF THE INVENTION

Polycarbonate (PC) resin is a thermoplastic resin that has excellent impact resistance and is rigid and light. Polycarbonate resin it is often used in a form of an alloy with other polymers due to its poor fluidity.

For example, when an acrylonitrile-butadiene-styrene (ABS) resin is blended with polycarbonate, the resulting resin composition maintains the impact resistance of the polycarbonate while exhibits improved fluidity, and it may be provided with a relatively low cost, as well. Therefore, the PC/ABS alloy is commonly used in an interior/exterior part material for a vehicle or a housing material for electronic devices, office machines, and the like.

When a PC/ABS alloy is used, however, to manufacture an injection-molded article using a mold with two or more gates, a phase-separation phenomenon noticeably occurs at a flow end where compositions inflowing from each gate meets each other. This may cause a weld line as the alloy has inherently two phases originating from polycarbonate (PC) and styrene-acrylonitrile copolymer (SAN), respectively, in the compositions. Such a weld line is vulnerable to impact. Thus if an article having such a weld line is subject to an impact, it may be easily broken without showing whitening phenomenon.

In order to address the aforementioned problems, there have been made many attempts to increase viscosity of the SAN so as to decrease the viscosity difference with the PC or to use an acrylate-based compatibilizer to inhibit the weld line formation. However, such measures may result in a higher viscosity of the resulting resin composition, which in turn can adversely affect the fluidity thereof. In addition, an excessive amount of the compatibilizer used in the composition may significantly deteriorate molding properties. When the resin composition having unsatisfactory fluidity or poor molding properties is subjected to an injection molding process to produce a large molded article such as parts for vehicles or an articles having a complicated shape, the resulting product can have fatal defects.

SUMMARY OF THE INVENTION

One embodiment of the present invention provides a resin composition capable of manufacturing an article having improved weld line impact strength and/or having excellent fluidity/moldability.

Another embodiment of the present invention provides an article including the resin composition.

One embodiment of the present invention provides a resin composition including (A) a polycarbonate resin; (B) a rubber-modified vinyl-based graft copolymer; and (C) about 1 to about 9 parts by weight of a random copolymer of a compound represented by the following Chemical Formula 1, an aromatic vinyl monomer, and a vinyl cyanide monomer (hereinafter, also referred to as "ArMA-SAN random copolymer"), based on about 100 parts by weight of the polycarbonate resin (A) and the rubber-modified vinyl-based graft copolymer (B):

[Chemical Formula 1]

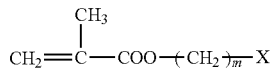

wherein m is an integer ranging from 0 to 10, and X is phenyl, methylphenyl, methylethylphenyl, methoxyphenyl, cyclohexylphenyl, chlorophenyl, bromophenyl, phenylphenyl, or benzylphenyl.

In the resin composition, the amount of the polycarbonate resin (A) may be about 10 to about 90 parts by weight, and the amount of the rubber modified vinyl-based graft copolymer (B) may be about 10 to about 90 parts by weight based on about 100 parts by weight of the polycarbonate resin (A) and the rubber-modified vinyl-based graft copolymer (B).

In the resin composition, the rubber-modified vinyl-based graft copolymer (B) may include about 5 to about 95 wt % of a mixture of an aromatic vinyl monomer and a vinyl cyanide monomer which is grafted on about 5 to about 95 wt % of a rubbery polymer selected from a butadiene rubber, a styrene/butadiene rubber, an acrylonitrile/butadiene rubber, an isoprene rubber, an ethylene/propylene rubber, an ethylene-propylene-diene terpolymer (EPDM) rubber, and a polyorganosiloxane/polyalkyl(meth)acrylate rubber.

The mixture of the aromatic vinyl monomer and the vinyl cyanide monomer may include about 50 to about 95 wt % of the aromatic vinyl monomer, and about 5 to about 50 wt % of the vinyl cyanide monomer.

In the resin composition, the compound represented by the above Chemical Formula 1 in the ArMA-SAN random copolymer (C) may be benzyl methacrylate, phenyl methacrylate, 2-phenylethyl methacrylate, 3-phenylpropyl methacrylate, or 4-phenylbutyl methacrylate.

Another embodiment of the present invention provides an article including the resin composition.

The resin composition may be capable of manufacturing an article having a high level of weld line impact strength. In addition, as it may have excellent fluidity/moldability, it can be used to produce a large molded article and/or an article having a complicated shape.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic resin composition according to one embodiment of the present invention includes (A) a polycarbonate resin; (B) a rubber-modified vinyl-based graft copolymer; and (C) about 1 to about 9 parts by weight of a random copolymer of a compound represented by the following Chemical Formula 1, an aromatic vinyl monomer, and a vinyl cyanide monomer (ArMA-SAN random copolymer), based on about 100 parts by weight of the polycarbonate resin (A) and the rubber-modified vinyl-based graft copolymer (B):

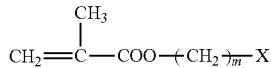

[Chemical Formula 1]

wherein m is an integer ranging from 0 to 10, and X is phenyl, methylphenyl, methylethylphenyl, methoxyphenyl, cyclohexylphenyl, chlorophenyl, bromophenyl, phenylphenyl, or benzylphenyl.

(A) Polycarbonate Resin

In the resin composition, the polycarbonate resin is a polyester resin having a carbonate bond, is not particularly limited to specific examples, and may be any applicable polycarbonate resin in the resin composition.

For example, the polycarbonate resin may be prepared by reacting one or more diphenols with phosgene, halogen formate, carbonic acid ester, or a combination thereof.

Examples of the diphenols may include without limitation hydroquinone, resorcinol, 4,4'-dihydroxydiphenyl, 2,2-bis-(4-hydroxyphenyl)-propane (hereinafter, referred to as bisphenol A), 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, 2,2-bis-(3,5-dibromo-4-hydroxyphenyl)-propane, bis(4-hydroxyphenyl)sulfoxide, bis(4-hydroxyphenyl)ketone, bis(4-hydroxyphenyl)ether, and the like, and combinations thereof.

The polycarbonate resin may have a weight average molecular weight of about 10,000 to about 200,000 g/mol, for example about 15,000 to about 80,000 g/mol, without limitation.

The polycarbonate resin may include a homopolymer and/or a copolymer obtained using two or more kinds of diphenols and/or a combination thereof. Other examples of the polycarbonate resin may include without limitation linear polycarbonate resins, branched polycarbonate resins, polyester carbonate copolymer resins, and the like, and combinations thereof.

Non-limiting examples of the linear polycarbonate resin may include a bisphenol-A-based polycarbonate resin. Non-limiting examples of the branched polycarbonate resin may include a polymer prepared by reacting a multi-functional aromatic compound such as trimellitic anhydride and/or trimellitic acid with one or more diphenols and carbonate. The multi-functional aromatic compound may be included in an amount of about 0.05 to about 2 mol % based on the total amount of the branched polycarbonate resin. The polyester carbonate copolymer resin may be prepared by reacting difunctional carboxylic acid with one or more diphenols and a carbonate. The carbonate may include a diaryl carbonate such as diphenyl carbonate, ethylene carbonate, and the like.

The resin composition may include the polycarbonate resin (A) in an amount of about 10 to about 90 parts by weight, for example about 15 to about 80 parts by weight, based on about 100 parts by weight of the polycarbonate resin (A) and the rubber-modified vinyl-based graft copolymer (B). In some embodiments, the resin composition may include the polycarbonate resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 parts by weight. Further, according to some embodiments of the present invention, the amount of the polycarbonate resin can be in a range from about any of the foregoing amounts to about any other of the foregoing amounts.

When the polycarbonate resin (A) is included in an amount within the above range, the balance of the properties such as impact strength and fluidity can be excellent.

(B) Rubber-Modified Vinyl-Based Graft Copolymer

The rubber-modified vinyl-based graft copolymer (B) may be prepared by grafting about 5 to about 95 wt % of a mixture of an aromatic vinyl monomer and a vinyl cyanide monomer on about 5 to about 95 wt % of a rubbery polymer.

Examples of the rubbery polymer can include without limitation butadiene rubbers, styrene/butadiene rubbers, acrylonitrile/butadiene rubbers, isoprene rubbers, ethylene/propylene rubbers, ethylene-propylene-diene terpolymer (EPDM) rubbers, and/or polyorganosiloxane/polyalkyl (meth)acrylate rubbers.

In the mixture of the aromatic vinyl monomer and the vinyl cyanide monomer, the aromatic vinyl monomer may be included in an amount of about 50 to about 95 wt %, and the vinyl cyanide monomer may be included in an amount of about 5 to about 50 wt %.

In some embodiments, the aromatic vinyl monomer may be included in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the aromatic vinyl monomer can be in a range from about any of the foregoing amounts to about any other of the foregoing amounts.

In some embodiments, the vinyl cyanide monomer may be included in an amount of about 5, 6, 7, 8, 9, 10, 11, 12, 13, 14, 15, 16, 17, 18, 19, 20, 21, 22, 23, 24, 25, 26, 27, 28, 29, 30, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the vinyl cyanide monomer can be in a range from about any of the foregoing amounts to about any other of the foregoing amounts.

Examples of the aromatic vinyl monomer may include without limitation styrene, C1 to C10 alkyl substituted styrene, halogen substituted styrene, and the like, and combinations thereof. Examples of the alkyl substituted styrene may include without limitation o-ethyl styrene, m-ethyl styrene, p-ethyl styrene, α-methyl styrene, and the like, and combinations thereof.

Examples of the vinyl cyanide monomer may include without limitation acrylonitrile, methacrylonitrile, fumaronitrile, and the like, and combinations thereof.

For example, the rubber-modified vinyl-based graft copolymer (B) may be an acrylonitrile-butadiene-styrene (ABS) graft copolymer. The ABS graft copolymer has a continuous phase of a styrene-acrylonitrile (SAN) copolymer and an elastomer phase of a butadiene rubber. In the copolymer, a small amount of styrene and acrylonitrile is grafted on a rubber particle so as to compatiblize the two phases. The ABS graft copolymer may be manufactured in a method of emulsion polymerization, mass polymerization, suspension polymerization, and the like.

The resin composition may include the rubber-modified vinyl-based graft copolymer (B) in an amount of about 10 to about 90 parts by weight, for example about 20 to about 85 parts by weight, based on about 100 parts by weight of the polycarbonate resin (A) and the rubber-modified vinyl-based graft copolymer (B). In some embodiments, the resin composition may include the rubber-modified vinyl-based graft copolymer in an amount of about 10, 11, 12, 13, 14, 15, 16, 17, 18, 19, 20, 21, 22, 23, 24, 25, 26, 27, 28, 29, 30, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 parts by weight. Further, according to some embodiments of the present invention, the amount of the rubber-modified vinyl-based graft copolymer can be in a range from about any of the foregoing amounts to about any other of the foregoing amounts.

(C) ArMA-SAN Random Copolymer

The ArMA-SAN random copolymer (C) is prepared by copolymerizing a compound represented by the following Chemical Formula 1, an aromatic vinyl monomer, and a vinyl cyanide monomer:

[Chemical Formula 1]

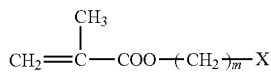

wherein m is an integer ranging from 0 to 10, and X is phenyl, methylphenyl, methylethylphenyl, methoxyphenyl, cyclohexylphenyl, chlorophenyl, bromophenyl, phenylphenyl, or benzylphenyl.

Examples of the compound represented by the above Chemical Formula 1 may include without limitation benzyl methacrylate, phenyl methacrylate, 2-phenylethyl methacrylate, 3-phenylpropyl methacrylate, 4-phenylbutyl methacrylate, and the like, and combinations thereof.

Examples of the aromatic vinyl monomer and vinyl cyanide monomer may be the same as described above.

The ArMA-SAN random copolymer (C) is prepared by copolymerizing about 50 to about 90 wt % of the compound represented by the above Chemical Formula 1, about 9 to about 40 wt % of the aromatic vinyl monomer, and about 1 to about 10 wt % of the vinyl cyanide monomer.

In some embodiments, the ArMA-SAN random copolymer (C) may include the compound represented by the above Chemical Formula 1 in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the compound represented by the above Chemical Formula 1 can be in a range from about any of the foregoing amounts to about any other of the foregoing amounts.

In some embodiments, the ArMA-SAN random copolymer (C) may include the aromatic vinyl monomer in an amount of about 9, 10, 11, 12, 13, 14, 15, 16, 17, 18, 19, 20, 21, 22, 23, 24, 25, 26, 27, 28, 29, 30, 30, 31, 32, 33, 34, 35, 36, 37, 38, 39, or 40 wt %. Further, according to some embodiments of the present invention, the amount of the aromatic vinyl monomer can be in a range from about any of the foregoing amounts to about any other of the foregoing amounts.

In some embodiments, the ArMA-SAN random copolymer (C) may include the vinyl cyanide monomer in an amount of about 1, 2, 3, 4, 5, 6, 7, 8, 9, or 10 wt %. Further, according to some embodiments of the present invention, the amount of the vinyl cyanide compound can be in a range from about any of the foregoing amounts to about any other of the foregoing amounts.

The resin composition includes the ArMA-SAN random copolymer (C) in an amount of about 1 to about 9 parts by weight, for example about 2 to about 8 parts by weight, based on about 100 parts by weight of the polycarbonate resin (A) and the rubber-modified vinyl-based graft copolymer (B). In some embodiments, the resin composition can include the ArMA-SAN random copolymer (C) in an amount of about 1, 2, 3, 4, 5, 6, 7, 8, or 9 parts by weight. Further, according to some embodiments of the present invention, the amount of the ArMA-SAN random copolymer (C) can be in a range from about any of the foregoing amounts to about any other of the foregoing amounts.

When the ArMA-SAN random copolymer (C) is included in an amount within the aforementioned range, it is possible to maintain the fluidity of the composition at a high level and to significantly improve mechanical properties (e.g., the weld line impact strength) of an article including the composition on its weld line.

In the alloy of the polycarbonate resin and the rubber-modified vinyl-based graft copolymer, a phase from the polycarbonate and a phase from the SAN are present, but these two phases have poor compatibility. Therefore, if such alloys are used to produce an injection-molded article by using a mold having at least two gates, the resulting article is prone to have a weld line, and thus to have significantly reduced weld line impact strength.

According to one embodiment of the present invention, incorporation of the ArMA-SAN random copolymer (C) may effectively suppresses a phase-separation/phase-aggregation between the polycarbonate resin and the rubber-modified vinyl-based graft copolymer, and thus the composition may exhibit a satisfactory level of fluidity/moldability and the resulting article prepared therefrom may show remarkably high weld line impact strength, as well.

Without wishing to be bound to any theory, it is believed that the ArMA-SAN random copolymer (C) has an aryl group in the compound represented by the above Chemical Formula 1, and thus it may have high affinity for a phase including the polycarbonate in the composition. As a result, the compatibility between PC/ABS resins may increase and the phase-separation therebetween may be greatly suppressed. At the same time, the copolymer has a SAN component, which may further allow an enhancement in the fluidity.

The resin composition may further include a methylmethacrylate-butadiene-styrene (MBS) graft copolymer in addition to the components (A) to (C) in an amount of about 1 to about 10 parts by weight based on about 100 parts by weight of the total weight of the polycarbonate resin (A) and the rubber-modified vinyl-based graft copolymer (B). Such inclusion may further increase impact strength of the resin composition.

In addition, the resin composition may further include one or more additives in addition to the components (A) to (C) if necessary, for example, to improve injection molding properties, to balance properties, and/or to satisfy a final purpose (application) of the resin composition. Examples of the additive may include without limitation flame retardants, a surfactants, nucleating agents, coupling agents, filler, plasticizers, impact-reinforcing agents, antifriction agents, antibacterial agents, release agents, antioxidants, inorganic material additives, colorants such as pigments and/or dyes, lubricants, anti-static agents, flame proofing agents, and the like, and the additive may be used singularly or in a combination of two or more.

The amount of the additive is not particularly limited and it may be appropriately adjusted if desired. For example, the additive may be included in an amount of about 0.01 to about 10 parts by weight based on about 100 parts by weight of the total amount of the polycarbonate resin (A) and the rubber-modified vinyl-based graft copolymer (B).

According to another embodiment of the present invention, an article including the resin composition is provided. The article may be manufactured by using the resin composition in various methods such as injection molding, blow molding, extrusion, and the like, which are known in a related art. The article may include various large components such as parts for vehicles and injection-molded articles having a complicated shape, but it is not limited thereto.

EXAMPLES

Hereinafter, the present invention is illustrated in more detail with reference to the following examples and comparative examples. However, the following examples and comparative examples are provided for the purpose of illustration only and the present invention is not limited thereto.

Each component used to prepare the following resin compositions according to Examples and Comparative Examples are illustrated.

(A) Polycarbonate (PC) Resin

SC-1080 having a weight average molecular weight of about 25,000 g/mol and made by Cheil Industries Inc. is used.

(B) Acrylonitrile-Butadiene-Styrene (ABS) Graft Copolymer

MA201 (c-ABS) made by LG Chem. and CHT (g-ABS) made by Cheil Industries Inc. are used.

(B-1) SAN Copolymer

AP-70 made by Cheil Industries Inc. is used.

(B-2) MMA-EA Copolymer

K-125P made by Rohm & Haas Co. is used.

(C) ArMA-SAN Random Copolymer

A phenylmethacrylate-styrene-acrylonitrile copolymer (trade name: TP003) made by Mitsubishi Rayon Co. Ltd. is used.

(C-1) Methacrylate-Butadiene-Styrene Copolymer

Metablen C-223A made by Mitsubishi Rayon Co. Ltd. is used.

Examples 1 to 5

Resin compositions according to Examples 1 to 5 are prepared by using the components in the amounts provided in the following Table 1. The resin compositions are manufactured by mixing each component in an amount as set forth in the following Table 1, extruding a resulting mixture in a twin-screw extruder, and forming the extrudate as pellets.

Comparative Examples 1 to 5

Resin compositions are prepared in the same manner as set forth in the Examples above except using the components in the amounts provided in the following Table 1.

TABLE 1

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| (A) SC-1080 | 70 | 95 | 90 | 80 | 82 | 85 | 85 | 80 | 80 | 60 |
| (B) MA201 | 15 |  |  |  |  |  |  |  |  |  |
| (B) CHT | 15 | 5 | 10 | 20 | 18 | 15 | 15 | 5 | 5 | 10 |
| (B-1) AP-70 |  |  |  |  |  |  |  | 15 | 8 | 23 |
| (B-2) K-125P |  |  |  |  |  |  |  |  | 7 | 7 |
| (C) TP003 | 2 | 4 | 3 | 5 | 7 | 10 |  |  |  |  |
| (C-1) C-223A |  | 5 |  |  |  |  |  |  |  |  |

Property Evaluation

The pellets prepared in Examples 1 to 5 and Comparative Examples 1 to 5 are dried at 100° C. for at least two hours and then, are subjected to a 10 oz injection molding machine set at an injection temperature of 260° C. to produce a ASTM test sample, respectively. In order to measure the weld line impact strength, a sample is prepared to have a weld line in the middle by using a mold with two gates at opposite sides thereof. Using the test samples, the properties are measured in accordance with the following tests, and the results are set forth in Table 2.

(1) Izod Impact Strength (Izod, kgf·cm/cm)

The notched Izod impact strength is measured by using a specimen having a thickness (t) of ⅛" according to ASTM D 256.

(2) Melt Flow Index (MI, g/10 min)

The MI is measured at 250° C. with a 10 kg load according to ASTM D 1238.

(3) Weld Line Izod Impact Strength (Weld Line Izod, kgf·cm/cm)

The unnotched Izod impact strength is measured by using a specimen having a weld line and a thickness of ⅛" according to ASTM D 256.

TABLE 2

|  |  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|---|
| Izod | 1/8" | 60 | 68 | 67 | 66 | 66 | 75 | 54 | 57 | 56 | 9 |
| MI | 250° C./10 kg | 35 | 29 | 27 | 31 | 32 | 35 | 23 | 47 | 23 | 36 |
| Weld line Izod |  | 20 | 33 | 49 | 29 | 19 | 10 | 120 | 10 | 26 | 10 |

In the compositions according to Examples 1 to 5, the decrease in fluidity is small and articles made therefrom exhibit excellent weld line impact strength. However, when the component (C) is included in an amount outside of the aforementioned range, or the MMA-EA copolymer or the SAN copolymer is used instead of the component (C), the composition has a greatly decreased fluidity and/or the article manufactured therefrom exhibits an unsatisfactory level of weld line impact strength.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A resin composition, comprising
(A) a polycarbonate resin; (B) a rubber-modified vinyl-based graft copolymer; and (C) about 1 to about 9 parts by weight of a random copolymer of a compound represented by the following Chemical Formula 1, an aromatic vinyl monomer, and a vinyl cyanide monomer, based on about 100 parts by weight of the polycarbonate resin (A) and the rubber-modified vinyl-based graft copolymer (B):

[Chemical Formula 1]

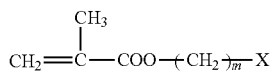

wherein m is an integer ranging from 0 to 10, and X is phenyl, methylphenyl, methylethylphenyl, methoxyphenyl, cyclohexylphenyl, chlorophenyl, bromophenyl, phenylphenyl, or benzylphenyl,
wherein the (C) random copolymer is prepared by copolymerizing about 50 to about 90 wt % of a compound represented by Chemical Formula 1, about 9 to about 40 wt % of an aromatic vinyl monomer, and about 1 to about 10 wt % a vinyl cyanide monomer, and
wherein the resin composition further comprises a methylmethacrylate-butadiene-styrene (MBS) graft copolymer in an amount of about 1 to about 10 parts by weight based on about 100 parts by weight of the polycarbonate resin (A) and the rubber-modified vinyl-based graft copolymer (B).

2. The resin composition of claim 1, comprising about 10 to about 90 parts by weight of the polycarbonate resin (A) and about 10 to about 90 parts by weight of the rubber modified vinyl-based graft copolymer (B), each based on about 100 parts by weight of the polycarbonate resin (A) and the rubber-modified vinyl-based graft copolymer (B).

3. The resin composition of claim 1, wherein the rubber-modified vinyl-based graft copolymer (B) comprises about 5 to about 95 wt % of a mixture of an aromatic vinyl monomer and a vinyl cyanide monomer which is grafted on about 5 to about 95 wt % of a rubbery polymer comprising a butadiene rubber, a styrene/butadiene rubber, an acrylonitrile/butadiene rubber, an isoprene rubber, an ethylene/propylene rubber, an ethylene-propylene-diene terpolymer (EPDM) rubber, a polyorganosiloxane/polyalkyl(meth)acrylate rubber, or a combination thereof.

4. The resin composition of claim 1, wherein the compound represented by the above Chemical Formula 1 comprises benzyl methacrylate, phenyl methacrylate, 2-phenylethyl methacrylate, 3-phenylpropyl methacrylate, 4-phenylbutyl methacrylate, or a combination thereof.

5. An article manufactured from the resin composition of claim 1.

6. The resin composition of claim 1, wherein the amount of the (C) random copolymer is about 1 to about 7 parts by weight based on about 100 parts by weight of the polycarbonate resin (A) and the rubber-modified vinyl-based graft copolymer (B).

* * * * *